United States Patent
Broadhurst

(10) Patent No.: US 11,902,612 B2
(45) Date of Patent: *Feb. 13, 2024

(54) VIDEO INPUT PORT

(71) Applicant: TEXAS INSTRUMENTS INCORPORATED, Dallas, TX (US)

(72) Inventor: Christopher James Broadhurst, Carp (CA)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 194 days.

This patent is subject to a terminal disclaimer.

(21) Appl. No.: 17/485,621

(22) Filed: Sep. 27, 2021

(65) Prior Publication Data

US 2022/0014810 A1 Jan. 13, 2022

Related U.S. Application Data

(63) Continuation of application No. 15/840,920, filed on Dec. 13, 2017, now Pat. No. 11,134,297.

(51) Int. Cl.
*H04N 21/426* (2011.01)
*H04N 21/231* (2011.01)

(52) U.S. Cl.
CPC ..... *H04N 21/42607* (2013.01); *H04N 21/231* (2013.01)

(58) Field of Classification Search
CPC ........................ H04N 21/42607; H04N 21/231
See application file for complete search history.

(56) References Cited

U.S. PATENT DOCUMENTS

| | | | |
|---|---|---|---|
| 5,691,975 A * | 11/1997 | Hamada | H04L 12/5602 370/232 |
| 5,793,420 A | 8/1998 | Schmidt | |
| 6,175,378 B1 * | 1/2001 | Maillard | H04N 7/17318 348/E7.071 |
| 6,567,415 B1 * | 5/2003 | Elwalid | H04Q 11/0478 370/468 |
| 6,870,475 B2 | 3/2005 | Kenneth et al. | |

(Continued)

FOREIGN PATENT DOCUMENTS

| | | |
|---|---|---|
| CN | 1056817703 A | 6/2016 |
| JP | 2000023023107 A | 1/2000 |

(Continued)

OTHER PUBLICATIONS

Chinese Search Report for Chinese Application No. 2018114627948 dated Jan. 5, 2022.

(Continued)

*Primary Examiner* — Michael B. Pierorazio
(74) *Attorney, Agent, or Firm* — Brian D. Graham; Frank D. Cimino

(57) ABSTRACT

In the described examples, a video integrated circuit (IC) chip includes a video input port (VIP) that receives a video stream. The video IC chip also includes a processing unit coupled to a non-transitory memory and is configured to detect the presence of a data stream provided to the VIP, cause the VIP to switch a target partition for the data stream from a given partition in the memory to another partition in the memory and to write the data stream to the other partition in the memory.

20 Claims, 2 Drawing Sheets

(56) References Cited

U.S. PATENT DOCUMENTS

| | | | |
|---|---|---|---|
| 7,739,712 B2* | 6/2010 | Boyden | H04L 63/0428 725/138 |
| 7,747,982 B1* | 6/2010 | Sie | H04N 21/4334 725/87 |
| 7,774,468 B1* | 8/2010 | Nag | H04L 47/828 709/224 |
| 8,375,414 B2* | 2/2013 | Covey | H04L 47/70 725/86 |
| 8,423,660 B2* | 4/2013 | Leung | H04H 20/16 370/312 |
| 8,451,804 B2* | 5/2013 | Vujcic | H04L 5/0094 370/336 |
| 8,542,642 B2* | 9/2013 | Lin | H04L 5/006 455/452.2 |
| 9,239,697 B2* | 1/2016 | Mahe | G06F 3/1431 |
| 9,432,298 B1* | 8/2016 | Smith | H04L 49/9057 |
| 9,442,869 B2 | 9/2016 | Vasant | |
| 9,548,082 B1 | 1/2017 | Simon | |
| 2002/0059481 A1* | 5/2002 | Nunally | G06F 15/7867 712/15 |
| 2003/0005214 A1 | 1/2003 | Chan | |
| 2005/0002405 A1* | 1/2005 | Gao | H04N 21/6405 375/E7.025 |
| 2005/0071882 A1* | 3/2005 | Rodriguez | H04N 21/2393 348/E7.071 |
| 2007/0085907 A1 | 4/2007 | Beauregard | |
| 2008/0172708 A1* | 7/2008 | Perry | H04W 72/30 725/110 |
| 2009/0055831 A1* | 2/2009 | Bauman | G06F 9/5077 718/104 |
| 2009/0183213 A1* | 7/2009 | Mukerji | H04N 21/6581 725/100 |
| 2012/0131622 A1* | 5/2012 | McDysan | H04N 21/6405 725/95 |
| 2012/0185899 A1* | 7/2012 | Riedl | H04N 21/2405 725/35 |
| 2012/0233644 A1* | 9/2012 | Rao | H04M 1/72412 725/62 |
| 2014/0368476 A1* | 12/2014 | Rauch | H02J 1/00 345/204 |
| 2015/0212955 A1 | 7/2015 | Vasant | |

FOREIGN PATENT DOCUMENTS

| | | |
|---|---|---|
| KR | 100776943 A | 1/2007 |
| WO | 98034395 A2 | 8/1998 |

OTHER PUBLICATIONS

China Doctoral Thesis Full-text Database (Information Technology Series); Hong, Xingyong; Research and Design of Instruction Cache for High Performance BWDSP Processor; Apr. 15, 2014.

* cited by examiner

VIDEO INPUT PORT

CROSS-REFERENCE TO RELATED APPLICATIONS

This application is a continuation of U.S. patent application Ser. No. 15/840,920, filed on Dec. 13, 2017, which is incorporated by reference herein in its entirety.

TECHNICAL FIELD

This disclosure relates to receiving a data stream via a video input port of an integrated circuit chip.

BACKGROUND

A system on a chip or system on chip (SoC or SOC) is an integrated circuit (IC) chip that integrates components of a computer or other electronic systems. An SoC may contain digital, analog, mixed-signal and/or radio-frequency (RF) functions on a common substrate. SoCs have a low rate of power consumption. Thus, SoC are employed in mobile computers, automotive computer systems, embedded systems, etc.

SoCs integrate a microcontroller (or microprocessor) with advanced peripherals such as a graphics processing unit (GPU), a Wi-Fi module and/or a coprocessor. In some examples, the SoC may include built-in memory.

Low-voltage differential signaling, or LVDS, also known as TIA/EIA-644, is a technical standard that specifies electrical characteristics of a differential, serial communications protocol. LVDS operates at low power and can run at high speeds using inexpensive twisted-pair copper cables.

FPD-Link is a high-speed digital video interface that implements LVDS. FPD-link provides a standard for connecting an output from a graphics processing unit in a laptop, tablet computer, flat panel display, or liquid crystal display (LCD) television to a controller of a display panel. Laptops, tablet computers, flat-panel monitors and televisions employ this interface internally.

SUMMARY

In a first example, a video integrated circuit (IC) chip includes a video input port (VIP) that receives a video stream. The video IC chip also includes a processing unit coupled to a non-transitory memory and is configured to detect the presence of a data stream provided to the VIP, to cause the VIP to switch a target partition for the data stream from a given partition in the memory to another partition in the memory and to write the data stream to the other partition in the memory.

In a second example, a system includes a video IC chip having a VIP that receives a video stream from a remote IC chip. The system also includes a video medium that facilitates the transfer of the video stream from the remote IC chip to the VIP. The VIP intermittently receives a data stream and the video IC chip and is configured to switch a target partition for the data stream from a given partition of a memory of the video IC chip to another partition of the memory of the video IC chip and to write the data stream to the other partition of the memory of the video IC chip.

In a third example, a method includes receiving, at a VIP of a video IC chip, a video stream transmitted from a remote IC chip. The method also includes receiving a control signal indicating that a data stream is provided to the VIP of the video IC chip. The method further includes switching a target partition for the VIP for the data stream from a given partition in a memory to another partition in the memory in response to receiving the control signal. The method still further includes writing the data stream in the video stream to the other partition of the memory of the video IC chip.

DETAILED DESCRIPTION

A video input port (VIP) of a video integrated circuit (IC) chip can interpret an incoming video stream as data. Accordingly, in the examples described, the video IC chip is configured/programmed to detect a data stream being provided to the video IC chip via the VIP concurrently with (or in place of) the video stream. Upon such a detection, the video IC chip can write the data stream to a memory (data storage) of the video IC chip.

In this manner, in situations where a remote IC chip is connected to the VIP via a bus interface (e.g., a video medium), the remote IC chip can provide the data stream without adding another physical connection between the remote IC chip and the video IC chip.

Figure 1:
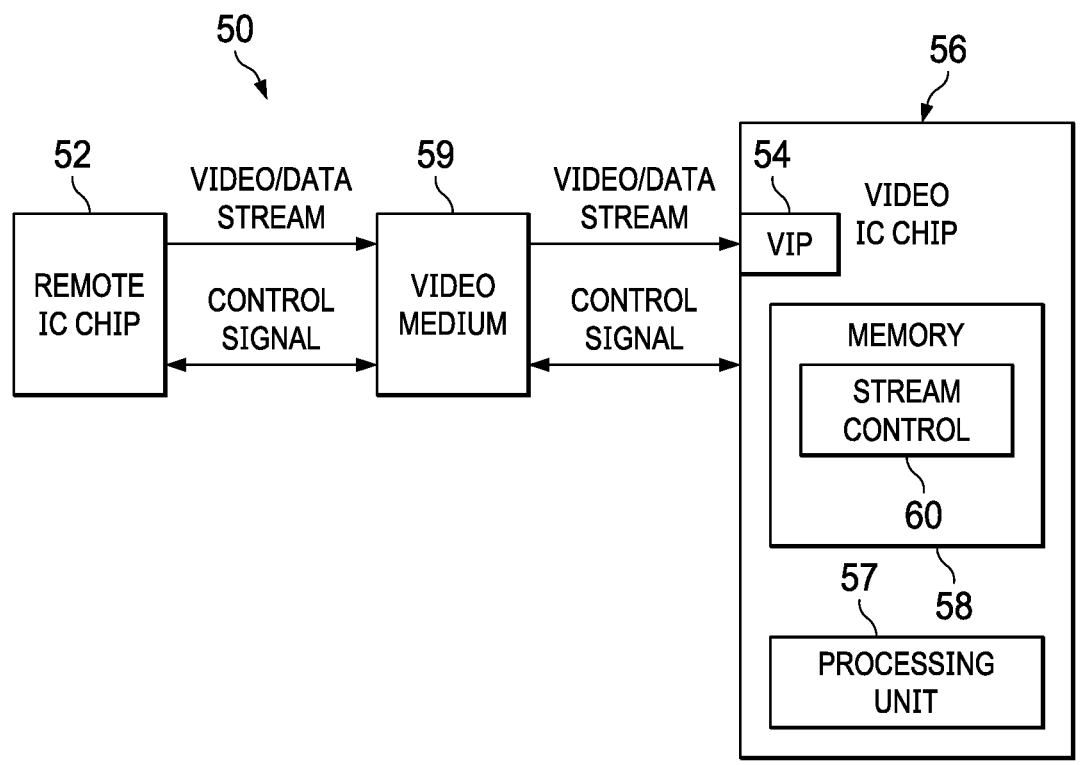
FIG. 1 is a diagram for a system that transmits a video stream and a data stream to a video input port (VIP) of a video integrated circuit (IC) chip.

FIG. 1 illustrates an example of a system 50 for transmitting a video stream and a data stream (non-video data) from a remote integrated circuit (IC) chip 52 to a video input port (VIP) 54 of a video IC chip 56. The video stream can be data that characterizes a series of one or more images. In some examples, the video stream can be raw video data or pre-processed video data, such as video data provided from an image-capturing device (e.g., a camera). The system 50 could be employed in situations where limited space is available for physical connections between the remote IC chip 52 and the video IC chip 56, such as automotive system and/or industrial control systems. The VIP 54, in some examples, includes a multi-channel raw video parser, various video processing blocks, and a flexible Video Port Direct Memory Access (VPDMA) engine to store incoming video in various formats.

The video IC chip 56 can be implemented as a system on a chip (SoC). In some examples, the video IC chip 56 includes a processing unit 57 (e.g., one or more processor cores) that executes machine-readable instructions stored in a non-transitory memory 58 (e.g., a volatile and/or non-volatile machine-readable medium).

The remote IC chip 52 provides a video stream and a control signal (a signal on a control plane) to the video IC chip 56 via a video medium 59. The video medium 59 can be representative of a physical connection (e.g., a data bus, a cable, and/or a set of one or more conductors) that establishes communication between the remote IC chip 52 and the video IC chip 56. As one example, the video medium 59 includes IC chips (and/or other circuit components) for establishing a serial communication channel. In some examples, the video medium 59 is up to about 10 meters in length or less. In other examples, the video medium 59 can be nearly any length. In at least some examples, the video medium 59 is implemented with a low-voltage differential signaling (LVDS) standard, such as an FPD-link.

The video stream can be implemented as a one-way high-speed data link (e.g., 1 Gigabit per second (Gbps) or more) from the remote IC chip 52 to the VIP 54 of the video IC chip 56. Additionally, the control signal may be a relatively low-speed bi-directional communication signal (e.g., 10 Mbps or less) between the remote IC chip 52 and the video IC chip 56. In such a situation, the video stream and the control plane can be multiplexed and transmitted over the video medium 56.

The control signal (labeled in FIG. 1 as "CONTROL SIGNAL") can indicate that the video stream is being sent from the remote IC chip 52. In response to receipt of the video stream at the VIP 54, the processing unit 57 executing a stream control 60 stored in the memory 58 of the video IC chip 56 encodes the video stream and stores the video stream in the memory 58. In some examples, the video IC chip 56 outputs the encoded video stream on a display.

Periodically and/or asynchronously, it may be desirable for the remote IC chip 52 to provide a data stream to the video IC chip 56. As used herein, the term "data stream" denotes a stream of non-video data (e.g., data other than video data). In some examples, the data stream implements a firmware update to the video IC chip 56. In other examples, the data stream could represent nearly any type of non-video data.

To initiate the sending of the data stream, the remote IC chip 52 provides a communication (e.g., a code) in the control signal to indicate that the data stream is forthcoming. In response, the processing unit 57 executing the stream control 60 employs the control signal to acknowledge the pending data stream.

The remote IC chip 52 sends the data stream in parallel with or in place of the video stream. Thus, for purposes of simplification of explanation, in FIG. 1, the signal from the remote IC chip 52 to the VIP 54 of the remote IC chip 52 is labeled as "VIDEO/DATA STREAM". However, it is understood that any given time, the "VIDEO/DATA STREAM" may have a video stream, a data stream or both.

In response to the notification in the control signal of sending of the data stream, the processing unit 57 executing the stream control 60 causes the VIP 54 to route the data stream to the memory 58 of the video IC chip 56. In particular, as discussed herein, the processing unit 57 executing the stream control 60 causes the VIP 54 to switch a target partition of the memory 130 for the data stream from a given partition of the memory 58 to another partition of the memory 58 and to write the data stream to the other partition of the memory 58 in a VPDMA operation.

As noted, in some situations, the video stream and the data stream are sent by the remote IC chip 52 in parallel, which is referred to as a combined video/data stream. In such a situation, the processing unit 57 executing the stream control 60 of the video IC chip 56 may be configured/programmed to write the content of each stream to memory 58 independently.

Upon completion of the transfer of the data stream, the remote IC chip 52 changes the control signal to indicate that the video stream is provided. In response, the processing unit 57 executing the stream control 60 of the video IC chip 56 causes the VIP 54 to process the video stream in the manner described herein. The stream control 60 can be implemented as machine-readable instructions stored on the memory 58 of the video IC chip 56.

By employment of the system 50, the same physical connection (the video medium 59) is employable to transfer a video stream and/or a data stream. In this manner, the need for separate physical connections for the video stream and the data stream is obviated. Accordingly, the system 50 can be retrofit (e.g., by updating software) into an existing system without adding a second physical connection between the remote IC chip 52 and the video IC chip 56.

Figure 2:
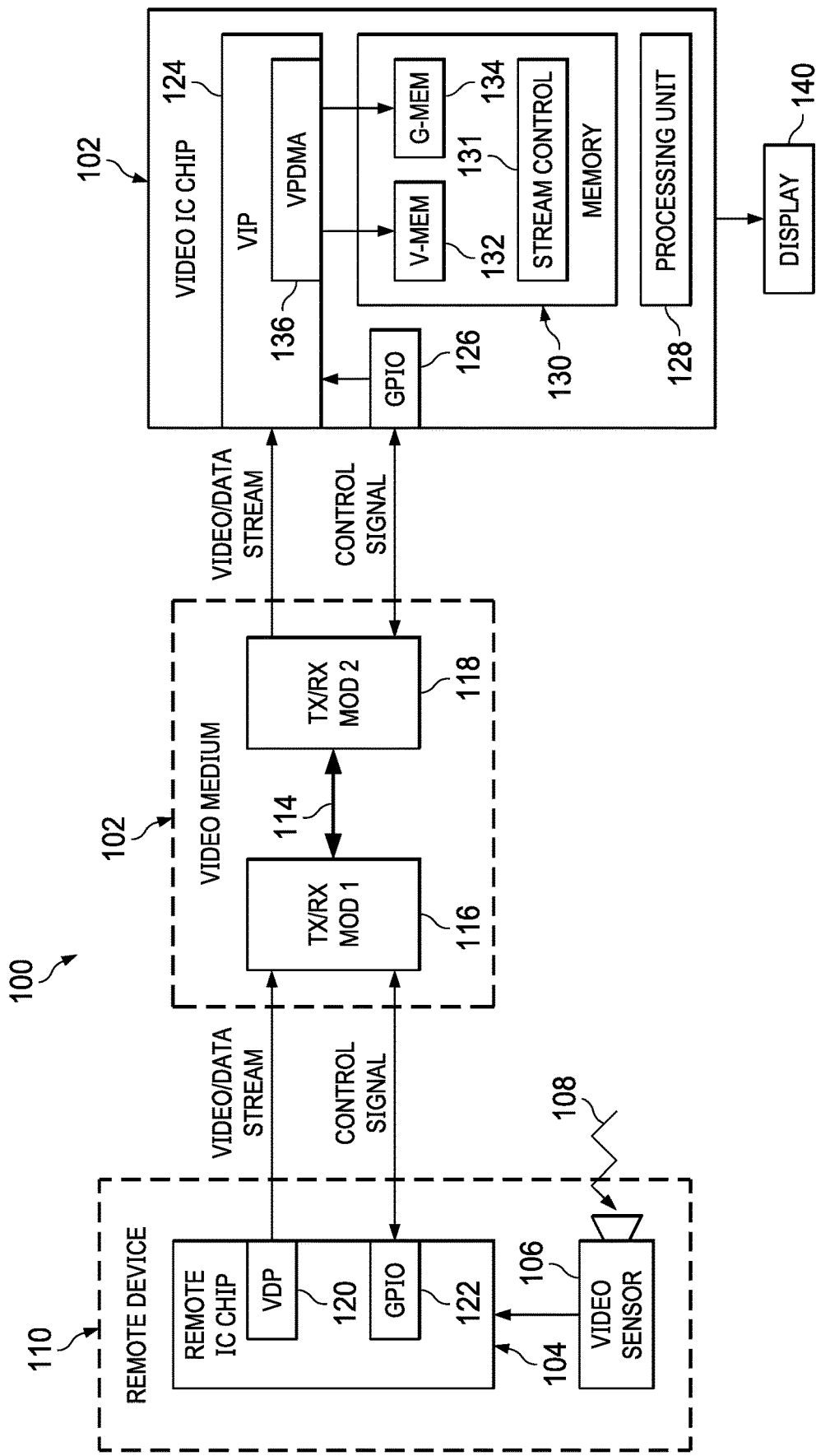
FIG. 2 is another diagram illustrating a system that transmits a video stream and a data stream to a VIP of a video IC chip.

FIG. 2 illustrates another example of a system 100 for providing a video stream and a data stream from a remote integrated circuit (IC) chip to a video IC chip 102. The system 100 may be implemented, for example, in a space-limited environment such as a vehicle or an industrial control system. In some examples, the remote IC chip 104 can be representative of an IC chip with a processor core, such as a microcontroller, etc. In other examples, the remote IC chip 104 can be representative of an application specific integrated circuit (ASIC) chip.

The remote IC chip 104 receives a video stream from a video sensor 106. The video sensor 106 can be implemented as nearly any device that can capture an image or stream of images, as indicated by the arrow 108. The video sensor 106 could be, for example, a video camera, a still-frame camera, etc. Additionally, in some examples, the video sensor 106 and the remote IC chip 104 may be integrated on a remote device 110. As one example, the remote device 110 may be a backup camera on a vehicle. In other examples, the remote device 110 may be a unit implemented on an industrial machine.

The remote IC chip 104 and the video IC chip 102 communicate via a video medium 112. The video medium 112 provides a communication channel 114 between a first transmitter/receiver module 116 (TX/RX MOD 1) and a second transmitter/receiver module (TX/RX MOD 2) 118. In some examples, the first TX/RX module 116 is implemented as a serializer IC chip and the second TX/RX module 118 is implemented with a deserializer IC chip. The communication channel 114 is a communication path that supports a one-way high-speed data link (e.g., about 1 Gbps or more) and relatively a low speed (e.g., 10 Mbps or less) bi-directional control channel. The communication channel 114 can be implemented as a low voltage differential signaling (LVDS) link, such as an FPD-link. The communication channel 114 can be implemented as a single conductor or set of conductors that transmit the one-way high-speed data link and the relatively low speed bi-directional control channel. That is, in at least one example, the one-way high-speed data link and the low speed data link are multiplexed and transmitted over the same conductor or set of conductors.

The remote IC chip 104 receives a video signal from the video sensor 106. The remote IC chip 104 digitizes the video signal to generate a video stream that is implemented as a stream of digital data characterizing one or more captured images. In some examples, the video stream can be implemented as a raw video stream that has little to no video processing other than the digitization.

The video stream is sent to the first TX/RX module 116 (labeled in FIG. 2 as "VIDEO/DATA STREAM") on a set of video data pins (VDP) 120. As discussed herein, at a given time, the VIDEO/DATA STREAM illustrated may include a video stream, a data stream (of non-video data) or a combination thereof. The video stream may represent a plurality of signals, which signals can include, but are not limited to a horizontal synchronization (HSYNC) signal, a vertical synchronization (VSYNC), a pixel clock etc. The first TX/RX module 116 serializes the video stream and transmits the raw video stream over the communication channel 114 via the high-speed data link to the second TX/RX module 118.

Additionally, the remote IC chip 104 generates a control signal (labeled in FIG. 2 as "CONTROL SIGNAL") that identifies the video stream. In some examples, control signal is provided on a control plane. The control signal can be, for example, a code applied at general-purpose input/output (GPIO) pins 122 of the remote IC chip 104. In this manner, the control signal can be a digital value that is written to a register (e.g., a scratch register) of the first TX/RX module 116. In other examples, the control signal can be integrated with the video stream signal. The first TX/RX module 116 transmits the control signal (e.g., as a register value) via the communication channel 114 along with the video stream via the low-speed control channel. In a first mode of operation (hereinafter, "the first mode of operation"), it is presumed that the control signal indicates that the video stream contains video data.

The second TX/RX module 118 de-serializes and decodes (if needed) the video stream and forwards the decoded video stream to a video input port (VIP) 124 of the video IC chip 102. In at least one example, the second TX/RX module 118 (controlled by the GPIO ports 122 of the remote IC chip 104) writes the control signal to a register that is accessible by GPIO pins 126 of the video IC chip 102. In another example, the control signal is integrated with the video stream. It is understood that the control plane is bi-directional. That is, the control signal can be generated and read by both the remote IC chip 104 and the video IC chip 102.

The video IC chip 102 can be implemented as a general purpose or special purpose computer chip, such as a system on a chip (SoC). The video IC chip 102 includes a processing unit 128 that is implemented as one or more processor cores. In some examples, the processing unit 128 can be implemented as an ARM processor or an x86 processor. For instance, the processing unit 128 could be implemented as a Cortex family processor. In such a situation, the video IC chip 102 could be implemented as a DRA7xx device processor or ARM57xx device from Texas Instruments™. It is appreciated that other types of processing units could alternatively be employed.

The video IC chip 102 includes a non-transitory memory 130. The memory 130 stores data and machine-readable instructions. The memory 130 can include volatile and/or non-volatile memory. In some examples, the memory 130 can be random access memory (RAM), flash memory or a combination thereof. The memory 130 includes a stream control 131 that, upon execution, causes the processing unit 128 to control the writing of data to the memory 130. Additionally, the memory 130 includes multiple partitions for storing data. In particular, the memory 130 includes a video memory partition 132 (labeled in FIG. 2 as "V-MEM") and a general memory 134 (labeled in FIG. 2 as "G-MEM"). It is understood that in other examples, additional partitions can be implemented. In still other examples, the video memory 132 and the general memory 134 may be integrated.

The control signal provided to the GPIO pins 126 of the video IC chip 102 is employed by the processing unit 128 executes the stream control 131 to control operation of the video IC chip 102. In particular, in the first mode of operation, the processing unit 128 executes the stream control 131 may read the control signal and cause video IC chip 102 to operate in video mode. In the video mode, the VIP 124 forwards the video stream to a video port direct memory access (VPDMA) 136 of the VIP 124. In response, in at least one example, the VPDMA 136 transfers the video stream to the video memory 132 of the memory 130 in a direct memory access (DMA) write.

In response to the writing of the video stream to the video memory 132, the processing unit 128 executing the stream control 131 accesses the video stream and outputs the video stream (or some portion thereof) on a display 140, or encode the video stream into a predetermined format. The predetermined format could be, for example, the Moving Pictures Experts Group Part 4 (MPEG-4) format, Joint Photographic Experts Group (JPEG) format, the Tagged Image File Format (TIFF), etc. As noted, the remote device 110 can be implemented as a back-up camera. In such a situation, the display 140 can be implemented as in-dash vehicle display.

In a second mode of operation, (hereinafter, "the second mode of operation"), the remote device 110 is configured to provide a (non-video) data stream to the video IC chip 102. The system 100 is configured such that the data stream can be multiplexed with the video stream to form a (combined) video/data stream signal that provides the video stream and the data stream concurrently. Moreover, in some examples, the remote IC chip 104 may temporarily cease the video stream and provide the data stream alone.

The data stream can be intermittently and/or periodically provided by the remote device 110. As one example, the data stream is provided to the video IC chip 102 to facilitate a firmware update to the video IC chip 102. However, it is understood that data in the data stream can be nearly any type of non-video data. Upon determining that the data stream should be provided to the video IC chip 102, the remote IC chip 104 sets the control signal to indicate that (non-video) data is being provided at the VDP 120. For instance, in at least one example the remote IC chip 104 sets the GPIO pins 122 to a value indicating that the data stream is being output at the VDP 120. The video medium 102 transmits the control signal via the relatively low speed control channel.

The remote IC chip 104 adds the data stream to the output of the VDP 120, such that the VDP 120 sends the video/data stream to the first TX/RX module 116. Alternatively, as noted, the remote IC chip 104 can cease the video stream and provide the data stream from the VDP 120 to the first TX/RX module 116. The first TX/RX module 116 serializes the video/data stream and provides the combined video/data stream or the dedicated data stream to the second TX/RX module 118 via the communication channel 114 via the high-speed data-link in a manner similar to the transmission of the video stream in the first mode of operation.

The second TX/RX module 118 provides the video/data stream to the VIP 124 of the video IC chip 102. Additionally, the GPIO pins 126 of the video IC chip 102 receive the control signal that (in the second mode of operation) have a value indicating that a data stream is provided. In response, the processing unit 128 (executing the stream control 131) causes the video IC chip to operate in a miscellaneous data mode. In the miscellaneous data mode, the processing unit 131 signals the VPDMA 136 that the data stream (with non-video data) is included in the video/data stream. In response, the VPDMA 136 switches a target partition for the data stream from the video memory 132 to the general memory 134 and writes the data stream into the general memory 134 without modification (processing). In some examples, the VPDMA 136 can execute a direct memory access (DMA) operation to write the data stream to the general memory 134.

As noted, in at least one example, the video/data stream carries both the video stream and the data stream concurrently. In such a situation, a given portion of bits in the video/data stream can be dedicated to video and another portion of the bits in the video/data stream are dedicated to the data stream. For instance, in an example where the video IC chip 102 is implemented as a DRA7xx or AM57xx IC chip, the data stream can be provided as 12 bits of a 24 bit RGB888 frame, and the video stream can be provided in another 12 bits of the RGB888 frame. In this situation, the VPDMA 136 can write the bits dedicated to the data stream to the general memory 134 and the VPDMA 136 can process bits dedicated to the video stream for writing to the video memory 132.

Additionally, as noted, in at least one other example, the video stream may be temporarily ceased for transmission of the data stream. In such a situation, each of the active bits (or some subset thereof) on the video/data stream are dedicated to the data stream. In this situation, the VPDMA 136 can write the active bits to the general memory 134.

In at least one example, the data stream has a plurality of frames. In such a situation, an initial (first) frame identifies an expected number of frames, a payload length and a cyclic Redundancy Check (CRC) for the payload. This can ensure that the complete data stream is delivered by the remote IC chip 104. Additionally, the data in the initial frame can be employed by the processing unit 128 executing the stream control 131 of the video IC chip 102 to determine when an acknowledgement (ACK) packet or negative acknowledgement (NAK) packet (e.g., due to corruption or a timeout) is to be provided via the control signal. It is understood that in other examples, other methods and/or signals may be employed by the processing unit 128 executing the stream control 131 of the video IC chip.

Upon completing transmission of the data stream, the remote IC chip 104 changes the control signal to indicate transmission of the video stream (indicating no non-video data), consistent with the first mode of operation. In such a situation, upon detection of the control signal, the processing unit 128 executing the stream control 131 returns the video IC chip 102 to the video mode to process the incoming video stream in the manner described herein.

By employment of the system 100, a data stream (non-video data) can be transmitted to the video IC chip 102 via the VIP 124. In this manner, in situations where a single communication channel (e.g., the communication channel 114) couples the remote IC chip 104 and the video IC chip 102, the communication channel 114 can be employed for both the data stream and the video stream. Accordingly, the system 100 obviates the need for separate physical data paths between the remote IC chip 104 and the video IC chip 102 for the video stream and the data stream. In some situations, such as automotive systems and industrial control systems, running a separate physical line would be expensive and/or infeasible.

Figure 3:
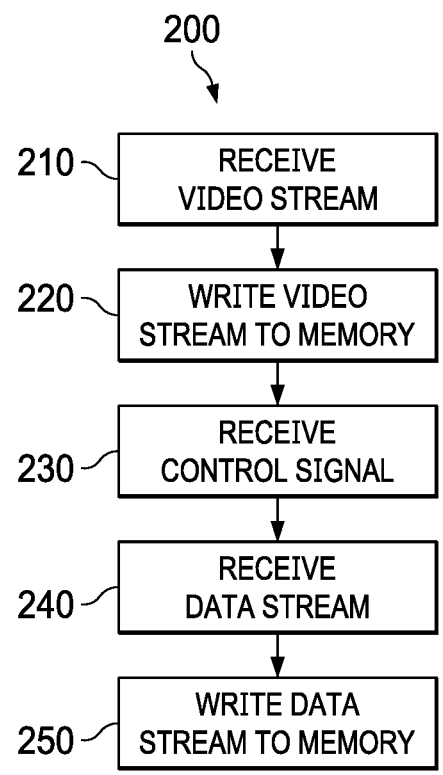
FIG. 3 is a flow diagram of a method for receiving a video stream and a data stream at a VIP of a video IC chip.

In view of the foregoing structural and functional features described above, an example method will be better appreciated with reference to FIG. 3. While, for purposes of simplicity of explanation, the example method of FIG. 3 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 3 illustrates a flowchart of an example method 200 for transferring a data stream via a VIP of a video IC chip. The method 200 can be implemented, for example, by the video IC chip 56 of FIG. 1 and/or 102 of FIG. 2.

At 210, the video IC chip receives a video stream at a VIP (video input port). At 220, the video IC chip writes the video stream to a memory (e.g., a video memory).

At 230, the video IC chip receives a control signal indicating that a data stream is to be provided to the VIP. At 240, the video IC chip receives the data stream on the VIP. At 250, the video IC chip writes a portion of the incoming signal on the VIP (e.g., a combined video/data stream) to memory in a direct memory access operation.

In this description, the term "based on" means based at least in part on. Modifications are possible in the described embodiments, and other embodiments are possible, within the scope of the claims.

What is claimed is:

1. An integrated circuit chip comprising:
an input port configured to receive a set of data;
a video input circuit coupled to the input port and configured to receive the set of data, wherein the video input circuit includes a direct memory access (DMA) circuit; and
a memory coupled to the DMA circuit that includes a first partition and a second partition;
wherein the DMA circuit is configured to:
determine whether the set of data includes video data;
based on the set of data including video data, write the set of data to the first partition; and
based on the set of data not including video data, write the set of data to the second partition.

2. The integrated circuit chip of claim 1, wherein:
the first partition includes a video memory; and
the second partition includes a general-purpose memory.

3. The integrated circuit chip of claim 1, wherein the first partition and the second partition are integrated into a single memory.

4. The integrated circuit chip of claim 1, wherein:
the input port is a first input port;
the integrated circuit chip further comprises a second input port coupled to the video input circuit in parallel with the first input port and configured to receive a control signal; and
the DMA circuit is configured to determine whether the set of data includes video data based on the control signal.

5. The integrated circuit chip of claim 1 further comprising a processing unit configured to, based on the set of data including video data, provide the video data for display on a display device coupled to the integrated circuit chip.

6. The integrated circuit chip of claim 1, wherein the set of data includes a firmware update.

7. The integrated circuit chip of claim 1, wherein the input port is a flat panel display (FPD) link input port.

8. The integrated circuit chip of claim 1, wherein the input port is configured to receive a stream that includes a video stream and a data stream such that either the video stream or the data stream includes the set of data.

9. The integrated circuit chip of claim 8, wherein the input port is configured to receive the video stream and the data stream concurrently.

10. A system comprising:
a first integrated circuit chip that includes:
a first output port configured to provide a set of data; and
a second output port configured to provide a control signal that indicates whether the set of data includes video data; and a second integrated circuit chip that includes:
 a first input port configured to couple to the first output port to receive the set of data;
 a second input port configured to couple to the second output port to receive the control signal;
 a video input circuit coupled to the first input port and the second input port that includes a direct memory access (DMA) circuit; and
 a memory coupled to the DMA circuit that includes a first partition and a second partition;
 wherein the DMA circuit is configured to:
  determine based on the control signal whether the set of data includes video data;
  based on the set of data including video data, write the set of data to the first partition; and
  based on the set of data not including video data, write the set of data to the second partition.

11. The system of claim 10, wherein:
the first partition includes a video memory; and
the second partition includes a general-purpose memory.

12. The system of claim 10, wherein the first partition and the second partition are integrated into a single memory.

13. The system of claim 10, wherein the second integrated circuit chip includes a processing unit configured to, based on the set of data including video data, provide the video data for display on a display device coupled to the second integrated circuit chip.

14. The system of claim 10, wherein the set of data includes a firmware update.

15. The system of claim 10, wherein the first output port is configured to provide a stream that includes a video stream and a data stream such that either the video stream or the data stream includes the set of data.

16. The system of claim 15, wherein the first output port is configured to provide the video stream and the data stream concurrently.

17. A method comprising:
 receiving a set of data at an input port;
 determining whether the set of data includes video data;
 determining whether to store the set of data in a first partition of a memory or a second partition of the memory based on whether the set of data includes video data; and
 storing the set of data in the memory.

18. The method of claim 17, wherein:
the input port is a first input port;
the method further comprises receiving a control signal at a second input port that specifies whether the set of data includes video data; and
the determining of whether the set of data includes video data is based on the control signal.

19. The method of claim 17, wherein the set of data includes a firmware update.

20. The method of claim 17 further comprising receiving a stream that includes a video stream and a data stream such that either the video stream or the data stream includes the set of data.

* * * * *